June 7, 1932.    F. M. SLOUGH    1,861,886
INDICATING SYSTEM AND APPARATUS
Filed April 24, 1925    2 Sheets-Sheet 1
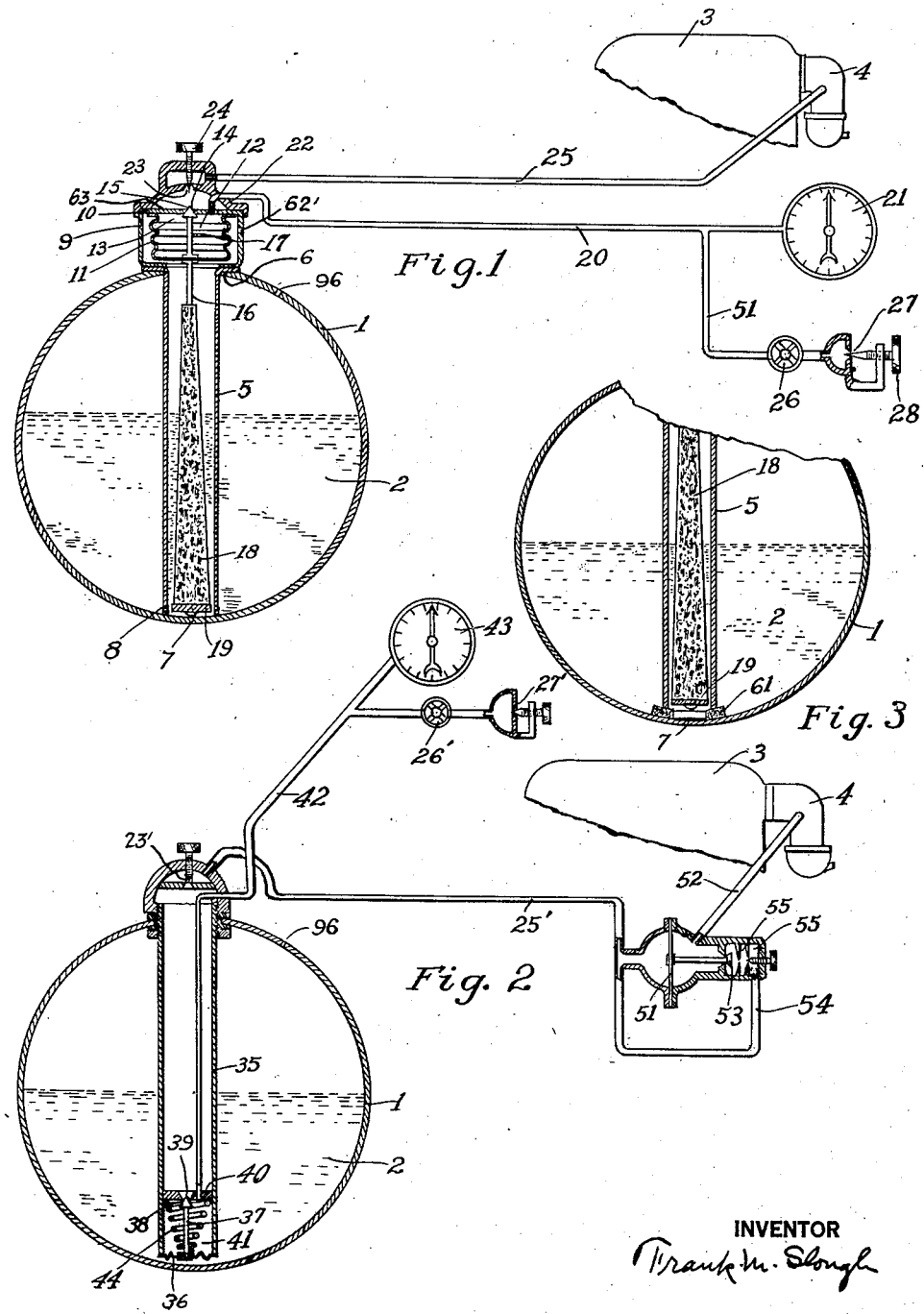
INVENTOR
Frank M. Slough June 7, 1932.   F. M. SLOUGH   1,861,886
INDICATING SYSTEM AND APPARATUS
Filed April 24, 1925   2 Sheets-Sheet 2
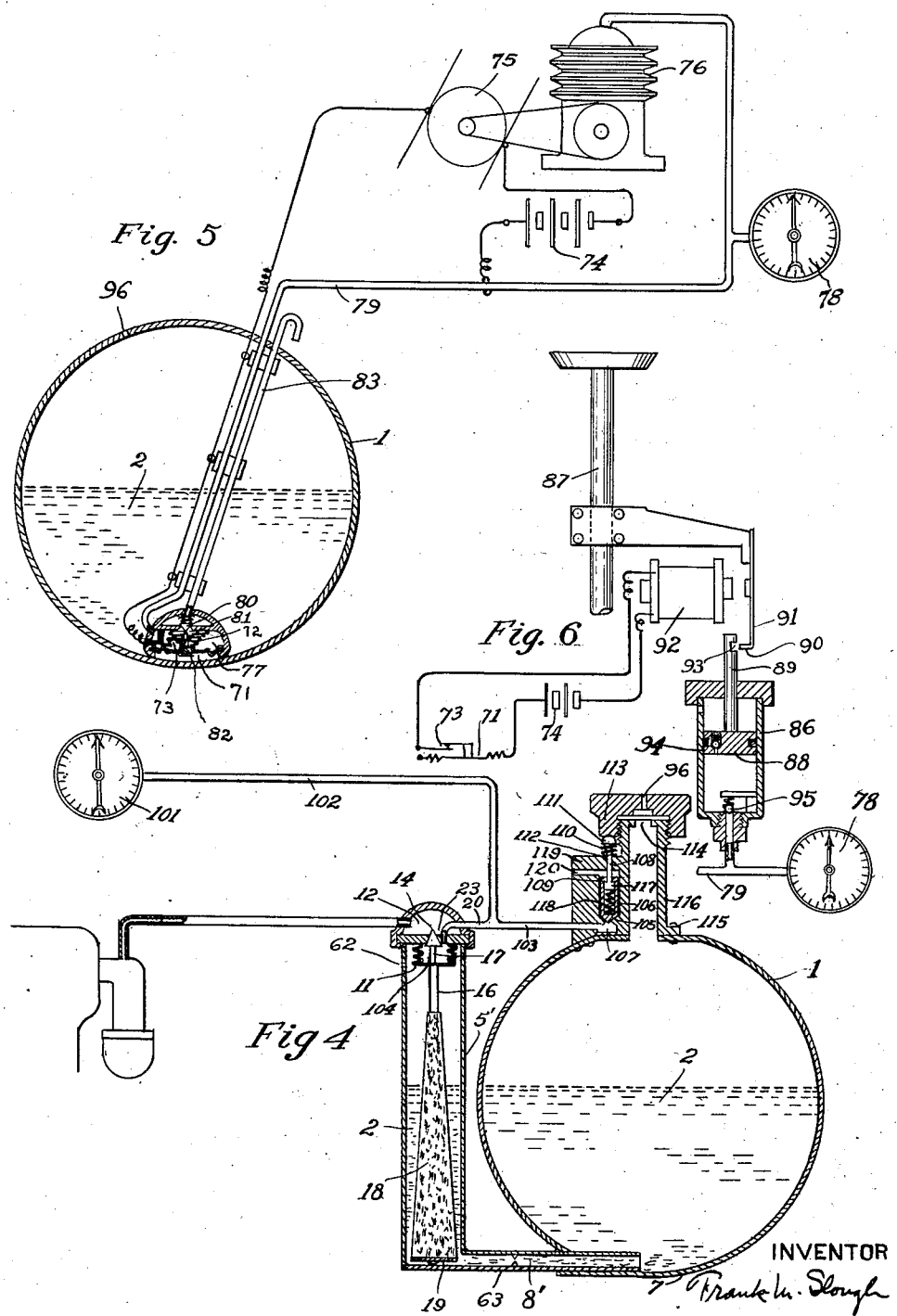

Patented June 7, 1932

1,861,886

UNITED STATES PATENT OFFICE

FRANK M. SLOUGH, OF ELYRIA, OHIO, ASSIGNOR TO THE ANDERSON COMPANY

INDICATING SYSTEM AND APPARATUS

Application filed April 24, 1925. Serial No. 25,673.

My invention relates to means for indicating at some relatively remote point such as the dash of an automotive vehicle, the quantity of liquid in a liquid container therefor. An object of my invention is to provide an improved system and apparatus therefor whereby the quantity of liquid such as may be contained in the fuel tank of such a vehicle may be remotely indicated.

Another object of my invention is to provide such a system wherein vaporization of the liquid or trapping of gas or liquids in the conduits of the system cannot impair the efficiency of the apparatus and the reliability of the indications.

Another object of my invention is to provide a system wherein a gas below atmospheric pressure may be readily and simply employed to effect a reliable indication of the amount of liquid fuel in the automotive fuel supply tank.

Other objects of my invention and the invention itself will be readily understood from the following description of the embodiments thereof illustrated in the accompanying drawings and referred to in the following specification.

Referring to the drawings:—

Fig. 1 shows diagrammatically one embodiment of my invention.

Fig. 2 shows a second embodiment thereof.

Figs. 3 and 4 show some modifications of parts contemplated.

Fig. 5 shows a third embodiment.

Fig. 6 shows a fourth embodiment.

Referring first to the embodiment of Fig. 1, at 1 I show an automotive engine fuel supply tank containing any variable quantity of liquid fuel such as gasoline indicated at 2; at 3 I indicate the automotive engine having an intake manifold at 4; at 5 I show a preferably tubular frame for a part of my improved mechanism preferably extending through an opening 6 in the top of the tank to the bottom wall 7 thereof to which it may be secured in a fluid-tight manner; I contemplate herein also an arrangement wherein the tube 5 comprises an exterior communicating portion of the tank. In Fig. 4 such a tube 5', vented at 62 communicates with the tank through duct 63. However, the tube 5 need not make fluid-tight connection with the bottom of the tank for most purposes. When made fluid-tight as illustrated a small orifice 8 is provided through the tube at its bottom end to communicate liquid fuel to the interior of the tube from the fuel 2 exterior thereof but at a relatively slow rate; when not made fluid-tight the restriction of flow from the exterior to the interior of the tube is accomplished by letting the end of the tube 5 contact with the bottom of the tank and the flow may be further restricted as shown in Fig. 3, by providing a pervious woolen, leather, or other gasket 61 between the end of the tube and the bottom of the tank which will permit restricted communication between the exterior and the interior of the tubular cylinder 5. The level of liquid inside the tube and outside thereof is maintained alike except for quick changes of level exteriorly of the tube. Air vents 62', Fig. 1, and 62, Fig. 4, maintain a quality of air pressures with atmospheric pressure upon the liquid surfaces within the tube.

The tube 5 has a flanged upper portion to which there is secured in a fluid tight manner, an enlarged section 9 having a rim 10. Within the enlarged tubular extension 9, outside of the tank 1, there is disposed a tubular container 11 having corrugated side walls 12. The element 11 together with the dividing wall 63 secured to the rim 10, likewise, forms a fluid containing chamber 13 having but one vent which is shown at 14 and is adapted to be opened or closed by a valve element 15. To the bottom wall of the element 11 is secured a depending rod 16 and an upwardly extending rod 17. The upwardly extending rod 17 carries at its top end the valve 15, and the rod 16 carries at its lower end a float 18 which may be of cork, and which may be weighted by a metallic washer 19. The weight of the parts carried by the bottom wall of the element 11 is preferably so proportioned that when the tank is approximately full of liquid the buoyancy of the float 18 will be approximately sufficient to close the valve opening 14 by seating the valve 15 therein. A duct 20 is provided which communicates with the interior of the chamber 13 and with a fluid pressure gage 21 which is adapted to indicate sub-atmospheric pressures existing within the chamber. A cap 22 is provided above the valve orifice 14 to enclose the space above such opening except preferably for a miniature orifice 23 in the wall thereof, the area of which opening may preferably be regulated by reciprocation of the adjusting screw 24.

From a body of fluid exerting pressure below atmospheric pressure such as the fluid in the intake manifold 4 of the engine 3, a duct 25 effects communication with the space above the valve opening 14. At 26 I show a venting valve adapted to restrictedly admit air through the conduits 51 and 20 to the interior of the chamber 13 which is in constant communication with the pressure gauge 21. Supplemental to the valve 26, or in place thereof I provide a manually adjustable restricted orifice 27 which by means of the adjustable screw 28 limits the communication of fluids between atmosphere and the interior of the chamber 13, so that the rates of equalizing fluid flows may be varied at will to suit the rates at which the exhausting means such as the engine 3 is effective to exhaust air from the chamber 13 for instance a more powerful exhausting means may require a larger vent opening 27.

The operation of the system of my invention will now readily be understood. When the engine is operated the gas comprising air in the intake manifold 4 thereof will be caused to be rarified and its pressure reduced below that of atmosphere by a certain number of units pressure per square inch; assuming now that with the parts preferably so proportioned and adjusted as aforesaid, the valve 15 would be closed by a slight excess of closing pressure, effected by the buoyancy of the float 18, while the tank is full of liquid fuel; when the quantity of liquid fuel is reduced then, the buoyancy of the float will be less effective to overcome the weight of the parts and the valve 15 will be opened; responsive to the opening of the valve communication will be had with the rarified gas in the intake manifold through the orifice 23 and duct 25 which will communicate a lifting movement to the bottom wall of the cell element 11 against the resiliency of its collapsible walls and against the weight of the carried parts.

When due to such opening of the valve the gas within the chamber 13 has been rarified to an extent sufficient to close the valve 15 by lifting of the bottom wall of the collapsible container, by so called "suction-action", the degree of rarification required to restore the valve will be indicated measurably by the pressure gauge 21 communicating with the chamber 13.

Prior to any such indication it may be desirable to open and close the valve 26 to first put the gas within the system comprising the duct 20 at atmospheric pressure; sometimes it may be found desirable to operate the system without any such manual operation of the valve 26 as by opening such valve permanently or while the system is in operation, and by adjusting the screw 28 within the orifice 27 to permit a tendency towards equalization of the pressure within the system and atmospheric pressure only at a slow rate. In the latter arrangement air is constantly flowing at an extremely slow rate into the system comprising the duct 20 through the orifice 27, while the valve 15 intermittently operates to open and close communication with the intake manifold to maintain that lifting effort on the valve 15 necessary to compensate for the increases in effective weight of the parts carried by the bottom wall of the element 11 resulting from the taking of liquid fuel from the tank. In such case it is preferable that the opening 27 be sufficiently large that no appreciable lagging of the indicator in point of time relative to changes in level of gasoline, especially after adding gasoline to the tank. If desired dependence may be placed upon the manual operation of the valve 26 alone to quickly establish equality of pressures within and without the system, with subsequent closing of the valve. In such a case it would only be necessary to operatively close such a valve after the tank had been filled with gasoline. However, I may even in such a case and with such a mode of operation maintain an extremely minute opening as at 27 to compensate for any small changes of liquid such as increases of liquid without requiring operation of the valve 26. I hereby expressly disclose each arrangement with its attendant possible modes of operation.

Referring now to the system of Fig. 2 I provide a tube 35 having its bottom end closed adjacent the bottom of the tank by a flexible diaphragm 36 and to the upper side of which diaphragm, a rod 37 is carried supporting at its upper end a valve 38 adapted to close a valve opening 39 in the upper wall 40 of a chamber 41 at the bottom end of the tube. A conduit 42 is adapted to communicate fluid pressures between a fluid pressure indicating gauge 43 and the fluid chamber 41 so that the pressure of fluid in the said chamber will always be indicated by the gauge 43; the valve 26' and adjustable orifice 27' are for the same purposes and functions as the corresponding parts in Fig. 1.

A spring 44 is compressed between the center of the diaphragm 36 and the underside of the chamber wall 40; a weight carried by the diaphragm may be substituted.

Fluid pressure exerted in an upward direction by the head of liquid in the tank 1, and either proportional or commensurable to its level, approximately, is exerted against the underside of the diaphragm 36.

The retractive effort of the spring 44 and the weight of the diaphragm carried parts are so proportioned relative to the possible "head" of liquid that when the gasoline tank is "full" the valve 38 will approximately be lifted with just enough pressure to close the opening 39.

An adjustable orifice 23' corresponding to the orifice 23 of Fig. 1 is provided in the duct 25' leading from the intake manifold 4 of the engine 3 and functions in the same way to prevent a too rapid change in pressure to be communicated to the fluid pressure balancing chamber 41 of Fig. 2 as also in the case of chamber 13 of Fig. 1.

So far as described the system of Fig. 2 operates similarly to that operation described for the system of Fig. 1 and as will now be understood, when the level of gasoline in the tank is lowered, effecting a lessened pressure effort on the underside of the diaphragm 36, the valve 38 will be open by spring 44 acting upon the diaphragm. A subsequent greater lifting effort will then be exerted to gradually again close the valve by "suction-action" exerted on the upper side of the diaphragm, effected by the resultant greater rarification of gas resulting from the opening of the valve to communicate some of the more dense gas in the chamber to the more rarified gas in the intake; whereby reduction of pressure of the contained gas in the chamber 41, is effected.

In both Figs. 1 and 2 the lifting effort required to offset the reduction in the quantity of gasoline is increased commensurably with such reduction and the valve operated by the liquid level responsive element is maintained open until the resultant increased lifting effort which is measurable, is approximately equal to the effort tending to open the valve; the head of liquid and therefore the quantity of gasoline is therefor indicated on the gauges at 43, Fig. 2, and at 21, Fig. 1, which at all times operate to indicate measurably in terms of fluid pressure the amount of such required lifting effort.

In connection with Fig. 2 adjacent the intake manifold 4 I show a controlling means applicable to the systems of both figures wherein a diaphragm 51 is operated upon by fluid pressure in the duct 25' on its one side and by fluid pressure communicated by a duct 52 from the intake manifold on its other side and which diaphragm is movable in both directions to open and close a throttling valve 53 in a duct 54 leading from the intake manifold 4 to the duct 25'. The duct 54 will preferably be provided with one or more orifices 55 to cause a difference of pressure to be exerted at the two ends of the duct when fluid is flowing there-through. This arrangement may be provided to maintain a throttling valve 53 closed upon an excess of pressure on that side of the diaphragm communicating with the intake manifold 4, and which valve will be opened only upon an excess of rarification on the intake manifold side of the valve. In either of the systems of Figs. 1 and 2 I may make the connection of the duct direct as in Fig. 1, with the duct 25 or I may make the connection through the check valve instrumentality comprising the diaphragm operated throttling valve and associated duct 54 as shown in Fig. 2.

The apparatus comprising the diaphragm 51, valve 53 and orifices 55 as above described, operates to maintain sub-atmospheric pressures within the tube 25' of an average sub-atmospheric pressure even though the speed of the engine 3 may vary so that there may be intervals when the fluid pressure in the manifold may approach that of atmosphere.

In Fig. 5 I show another embodiment of my invention, wherein the diaphragm 71 and spring 72 are disposed and operate as does the diaphragm 36 and spring 44 of Fig. 2. However, the system of Fig. 5 preferably dispenses with such a valve as that shown at 38 employing instead a set of electrical contacts 73 adapted to close a circuit comprising the source of current 74, and an electrical motor 75, whenever the diaphragm is moved sufficiently by the spring 72 against the pressure exerted by the pressure of liquid exerted on its outer surface. Closure of the contacts will cause current from the source, which may be the automobile battery, or generator, to start the motor which drives an exhausting or "vacuum" pump 76, to exhaust air from the space comprising the air chamber 77 to cause air pressure of atmosphere exerted against the surface of liquid in the tank to be effective to assist the pressure of liquid on the diaphragm to restore it to non-contact closing position whereupon the motor and pump are stopped, until by substracting more gasoline from the tank 1 the lessened pressure exerted against the bottom surface of diaphragm 71 permits the spring plus the weight of the parts to reclose the contacts with consequent balancing of pressures as before described. This action may be continuous and effect a vibratory action of the diaphragm. The "vacuum" gauge 78 in the line from the exhaust pump 76, and communicating with the chamber 77 will then indicate the quantity of gasoline in the tank.

In this embodiment the motor 75, pump 76, and gauge 78 will preferably be comprised in one unitary apparatus applied to the automobile or other vehicle instrument board or "dash", and only a single conduit 79 will be required to extend to the tank at the remote part of the vehicle.

The chamber 77 may be vented as described and shown for the chamber 41, Fig. 2, or, preferably, will be provided with a venting spring pressed valve 80 movable to admit enough air to restore an approximate balance of forces acting upon the diaphragm 71 whenever gasoline is added to the tank to cause the valve push rod 81 which is supported and removed by the upwardly moving diaphragm center plate 82 to engage and lift the valve 80 until a balance of pressures is restored and the rod 81 and valve 80 again disengaged. The conduit 83 leads from the valve 80 exteriorly of the tank to atmosphere.

In Fig. 4, I show an embodiment of my invention wherein the venting of atmosphere to the gaseous compensating and indicating system which comprises in the illustrated apparatus, the indicating vacuum pressure gauge 101, ducts 102, 103, 20 and balancing chamber 104, is accomplished by a valve 105 which is opened whenever the "filling" cap 113 is unscrewed from the "filling" tube 116, which is threaded on its upper outer surface. The movable valve element 105 is lifted by upwardly movable telescoping elements 106 and 108, the element 108 having an enlarged lower end 117 fitting within a cylindrical recess within the element 106, such enlarged lower end having a shoulder on its upper portion adapted to engage the inwardly extending flange 109 of the element 106.

A spring 118 is provided to distend the elements 106 and 108 whenever the cap 113 is removed and thereby relieves the downward pressure otherwise exerted by the lower face of its downwardly depending skirt, against the contact piece 111 affixed onto the upper end of the rod 108. The intermediate portion of the rod 108 is slidingly fitted through a vertical bore 112 through the lateral flange 119 of the filling tube 116. A spring 110 serves to lift the rod 108 when such downward pressure of the screwed-on cap 113 is removed by raising the cap, by unscrewing it from the tube. When the cap is removed the spring 110 lifts the rod 108 until the upper shoulder on the lower end of rod 108 engages the flange 119 to lift the element 106.

Such lifting moves the valve element 105 carried on the end of the element 106 from the valve seat and permits air to flow into the passages of the said compensating and indicating system 101, 102, 103, and 104, such air being communicated from atmosphere thereto, through the passage 120, past the outer surface of the element 106, through the opening provided by the lifting of the valve 105 from its seat, the valve chamber 107 and into the system via duct 103.

The system is now vented and ready for replenishing of the supply of liquid fuel in the tank 1, whereupon the fuel is poured through the tube 116 via its opening 114.

The cap being subsequently replaced causes downward pressure upon the contact piece 111 of the rod 108 and re-seats the valve 105 to close the valve opening. The system will now operate as before described for the other embodiments having the hand operated venting valves, until the supplied liquid fuel is again replenished as described.

It will be understood that with the foregoing vented embodiments illustrated and described any of the alternative forms of vents may be employed, i. e. the miniature aperture which is continuously open as 27, Fig. 1, the hand operated vent 26 or 26', Figs. 1 and 2, or the automatic valve vent as in Fig. 4, at 105, or at 80, Fig. 5, or a plurality of such vents may be supplied to any one of such systems.

In Fig. 6, I show a modification of the system of Fig. 5 wherein the exhaust pump 86 adapted to exhaust air from the conduit 79, the chamber 77 and the gauge 78 is mechanically driven by an automotive engine driven part, as for instance as shown herein, a reciprocatory valve rod 87, which moves a piston rod 89 of the piston 88 of an exhaust pump 86, whenever the electro-magnetic clutch is operated. The clutch comprises relatively movable clutching parts 89 and 90 and is operated by the electro-magnet 92, causing the spring carried armature 91 to be attracted, causing its end 90 to be drawn into the notch 93 of the rod 89 whenever current is passed from the source of electrical current 74 through the contacts 73 one of which is movable by the diaphragm 71, into contact with a stationary contact as shown in Fig. 5. The other parts are as shown in Fig. 5, and electromagnet of Fig. 6 simply replaces the motor 75 of Fig. 5 in the electrical circuit.

The exhaust pump 86, may be of various known constructions, and may be provided as shown with spring pressed valves 95 and 94 having well known functions in such a pump. The valve 95 also serves to prevent communication between the conduit 79 and the pump cylinder when the pump is at rest and the gas in the conduit is below atmospheric pressure.

In the different figures vents 96 are provided in an upper wall of the fuel tanks to keep the liquid therein under atmospheric pressure.

In some of the figures I have shown a spring such as 44 and in other figures I have shown a weight 18—19 to balance the pressure effort of a "full" tank of liquid. In some of the appended claims I will refer to such broadly equivalent elements as tractive means, broadly.

Having thus described my invention as embodied in the systems of the different figures of the drawings, and shown more or less diagrammatically, therein, and as they may be modified in view of the disclosures herein, I am aware that numerous and extensive departures may be made from the embodiments herein illustrated or described, including such as illustrated and described, but without departing from the spirit of my invention.

I claim:—

1. An apparatus for measuring the quantity of liquid in a container, comprising a liquid displacing element having a portion heavier than the displaced liquid and extending close to the bottom of the container and exposed to the buoyant effort of liquid therein, a pressure chamber having relatively stationary and movable walls, conduit means including an inlet port for admitting air from atmosphere to the chamber, a pressure gauge, a duct for effecting communication between the gauge and chamber, a fluid exhausting means, a conduit means including an exhaust port in the stationary wall of said chamber, adapted to effect communication between the interior of the chamber and the fluid exhausting means, a valve controlling the passage of air through the third means, means to communicate operative movement to said valve from said movable wall, and means to communicate actuating pressure from the displacement element to the movable wall, and a valve for said first named conduit means, controlling the flow of air admitted through the inlet port from atmosphere to the chamber, and means operable responsive to an act incidental to the replenishment of the liquid in the tank to operate said valve to admit air to the chamber.

2. An apparatus for indicating the quantity of liquid in a container, comprising a liquid displacing element having a portion heavier than the displaced liquid and extending close to the bottom of the container and exposed to the buoyant effort of liquid therein, a pressure chamber having relatively stationary and movable walls, means for restrictedly conducting air from atmosphere to the chamber, a pressure gauge, a duct for effecting communication between the gauge and chamber, a fluid exhausting means, a means adapted to effect communication between the interior of the chamber and the fluid exhausting means, a valve controlling the passage of air through the third means, means to communicate operative movement to said valve from said movable wall, and means to communicate actuating movement from the displacement element to the movable wall, and check valve means for said second means for maintaining a relatively high degree of exhaustion of air in the chamber subsequent to a decrease in the exhausting power of the said exhausting means.

3. The method of measuring the amount of liquid in a tank, comprising suspending a weight in the liquid of such a nature that upon approximately a full tank condition, the effect of gravity upon the weight will be approximately counter-balanced by the buoyant effect of the liquid upon the weight, and then lifting the weight to a predetermined elevation by effecting a movement thereof commensurably to subtracted amounts of liquid, to hold the weight in substantial equipoise at said predetermined elevation, and measuring the lifting effort.

4. The method of indicating the amount of liquid in a tank, comprising substantially freely suspending an elongated weight in the tank, having such volumetric and gravitational qualities that upon any substantial depletion of liquid from a full tank condition, the effects of buoyancy will be overcome by the effect of gravity upon the weight, and then lifting the weight to a predetermined elevation by effecting a movement thereof substantially commensurable to the increased effect of gravity over the counter-balancing effect of buoyancy, as the supply of liquid in the tank is depleted, as to maintain the weight in substantial equipoise at said predetermined elevation, and indicating the quantitative value of the lifting effort.

5. In a liquid tank indicating system for automotive vehicles, the method of indicating the amount of liquid in the tank, consisting in suspending an elongated weight in the tank, having such volumetric and gravitational qualities that upon any substantial depletion of liquid in the tank from a full tank condition that the gravitational effect on the weight will exceed the buoyant effect of the liquid, proportional to the volume of liquid displaced by the weight, and by exhaustion of air from a space above an element of said weight, commensurably with the depletion of liquid in the tank, to lift the weight to a predetermined elevation by effecting a movement thereof commensurable with the amount of liquid withdrawn from the tank, and evaluating the reduction of fluid pressure in said space.

6. In an indicating system for containers, the combination with a liquid containing container, means movable responsive to pressure of liquid at the bottom of the container, means opposing the effect of the pressure of liquid upon said movable means, comprising a chamber having a movable wall, means to communicate motion between said movable wall and said movable means, a pump, a conduit effecting communication between said pump and said chamber, and controlling means for said pump responsive to movement of said movable means to effect operation of said pump, according to the length of any period during which said movable means is moved from a predetermined normal position, a pressure gauge adapted for disposition remotely of the container, and conduit means effecting intercommunication of said gauge and said chamber.

7. In an indicating system for containers, the combination with a liquid containing container, means movable responsive to pressure of liquid at the bottom of the container, means opposing the effects of the pressure of liquid upon said movable means, comprising a chamber having a movable wall, means to communicate motion between said movable wall and said movable means, a pump, a conduit effecting communication between said pump and said chamber, and controlling means for said pump responsive to movement of said movable means to effect operation of said pump, according to the length of any period during which said movable means is moved from a predetermined normal position, and means comprising a remotely disposed indicator for indicating the fluid pressure in said chamber.

8. In an automotive vehicle, the combination with a fuel tank of a supplemental tank removably mounted alongside and closely adjacent to the fuel tank, said supplemental tank being of relatively small capacity and of substantially the same vertical depth as said fuel tank, a permanently open connection between the bottom portion of the fuel tank and the bottom portion of the supplemental tank whereby the level of liquid in each tank will be maintained substantially the same, and fuel level responsive mechanism mounted in the supplemental tank and connected with a remotely positioned visible indicator whereby the level of fuel in the main tank is approximately indicated by the level of fuel in said supplemental tank.

9. In an automotive vehicle, the combination with a fuel tank, of a self contained detachably mounted unit alongside the fuel tank and closely adjacent thereto, said unit comprising a relatively small supplemental tank having a float actuated mechanism mounted therein, said supplemental tank having a permanently open connection with said fuel tank whereby the liquid in the supplemental tank is maintained at substantially the same level as the liquid in the fuel tank, an independently mounted indicating device remote from said unit, and means for controlling said indicating device from said float actuated mechanism.

In testimony whereof I hereunto affix my signature this 24th day of April, 1925.

FRANK M. SLOUGH.